United States Patent
Akimoto et al.

(10) Patent No.: US 7,543,483 B2
(45) Date of Patent: Jun. 9, 2009

(54) ENGINE MISFIRE DETECTION APPARATUS FOR INTERNAL COMBUSTION ENGINE AND ENGINE MISFIRE DETECTION METHOD

(75) Inventors: Hikokazu Akimoto, Aichi-gun (JP); Takahiro Nishigaki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 11/919,214

(22) PCT Filed: Nov. 29, 2006

(86) PCT No.: PCT/JP2006/323764

§ 371 (c)(1),
(2), (4) Date: Oct. 25, 2007

(87) PCT Pub. No.: WO2007/086192

PCT Pub. Date: Aug. 2, 2007

(65) Prior Publication Data

US 2008/0196485 A1 Aug. 21, 2008

(30) Foreign Application Priority Data

Jan. 27, 2006 (JP) ............................. 2006-019177

(51) Int. Cl.
*G01M 15/11* (2006.01)
(52) U.S. Cl. .................................................. 73/114.03
(58) Field of Classification Search ............. 73/114.02, 73/114.03, 114.04, 114.05, 114.12
See application file for complete search history.

(56) References Cited

U.S. PATENT DOCUMENTS

| 5,309,756 A | 5/1994 | Osawa et al. |
| 2003/0225504 A1 | 12/2003 | Katayama |
| 2007/0261484 A1* | 11/2007 | Nishigaki et al. ........... 73/117.3 |
| 2008/0148835 A1* | 6/2008 | Akimoto et al. ........... 73/116.01 |

FOREIGN PATENT DOCUMENTS

| JP | A 05-018311 | 1/1993 |
| JP | A 09-222046 | 8/1997 |
| JP | A 10-054295 | 2/1998 |
| JP | A 10-318033 | 12/1998 |
| JP | A 2000-240501 | 9/2000 |
| JP | A 2002-004936 | 1/2002 |
| JP | A 2003-343340 | 12/2003 |

* cited by examiner

*Primary Examiner*—Eric S McCall
(74) *Attorney, Agent, or Firm*—Oliff & Berridge, PLC

(57) ABSTRACT

In the case of non-execution of catalyst warm-up acceleration control, the engine misfire detection procedure compares a 30-degree rotation time computed as a time required for a 30-degree rotation of an engine crankshaft with preset reference values Tref1 and Tref2 and distinctly detects the occurrence of intermittent engine misfires and the occurrence of either a single engine misfire or consecutive engine misfires (steps S120 to S150). In the case of execution of the catalyst warm-up acceleration control, the engine misfire detection procedure compares the 30-degree rotation time computed as the time required for a 30-degree rotation of the engine crankshaft with preset reference values Tref3 and Tref4 and distinctly detects the occurrence of the consecutive engine misfires and the occurrence of either the single engine misfire or the intermittent engine misfires (steps S160 to S190). This arrangement ensures accurate detection and identification of engine misfires, regardless of execution or non-execution of the catalyst warm-up acceleration control.

22 Claims, 7 Drawing Sheets

ENGINE MISFIRE DETECTION APPARATUS FOR INTERNAL COMBUSTION ENGINE AND ENGINE MISFIRE DETECTION METHOD

TECHNICAL FIELD

The present invention relates to an engine misfire detection apparatus for an internal combustion engine and a corresponding engine misfire detection method. More specifically the invention pertains to an engine misfire detection apparatus for detecting a misfire of a multi-cylinder internal combustion engine in a hybrid system where the internal combustion engine is equipped with an emission control device for emission control in an exhaust system, as well as a corresponding engine misfire detection method for the internal combustion engine.

BACKGROUND ART

One proposed structure of an engine misfire detection apparatus detects a misfire of an engine mounted on a vehicle, based on an output torque command value of a first motor generator (see, for example, Japanese Patent Document 1). This vehicle is equipped with the engine, a planetary gear mechanism that has a carrier connected to a crankshaft of the engine and a ring gear connected to an axle of the vehicle, the first motor generator that is connected to a sun gear of the planetary gear mechanism, and a second motor generator that is connected to the axle. The engine misfire detection apparatus of this proposed structure varies the output torque of the first motor generator in synchronism with an explosive combustion timing of the engine, in order to reduce a potential vibration caused by torque pulsation of the engine. An engine misfire is detected in response to a significant fall of the output torque command value from its previous value.

Patent Document 1: Japanese Patent Laid-Open No. 2000-240501

DISCLOSURE OF THE INVENTION

The vehicle of the above structure is drivable with the output power of the second motor generator. When an emission control device for controlling the emission from the engine has not been warmed up sufficiently to attain required functions, specific engine control different from standard engine control is performed to delay the ignition timing and wait for the sufficient warm-up of the emission control device. The torque pulsation of the engine under this specific engine control is different from the torque pulsation under the standard engine control. This may require different vibration control of the first motor generator. There is accordingly a probability of failed detection of an engine misfire according to the output torque command value of the first motor generator.

An object of the invention is to provide an engine misfire detection apparatus for the internal combustion engine and a corresponding engine misfire detection method that attain accurate detection of a misfire of an internal combustion engine equipped with an emission control device for emission control in an exhaust system, regardless of execution or completion of warm-up acceleration control of the emission control device. An object of the invention is to provide the engine misfire detection apparatus for the internal combustion engine and the corresponding engine misfire detection method that attain accurate and effective identification of a misfire of the internal combustion engine equipped with the emission control device for emission control in the exhaust system, regardless of execution or completion of warm-up acceleration control of the emission control device.

In order to attain at least part of the above and the other related objects, an engine misfire detection apparatus for an internal combustion engine and a corresponding engine misfire detection method of the present invention have the configurations discussed below.

According to one aspect, the present invention is directed to an engine misfire detection apparatus for detecting a misfire of a multi-cylinder internal combustion engine in a hybrid system where the internal combustion engine is equipped with an emission control device for emission control in an exhaust system. The engine misfire detection apparatus includes: a rotational position detector that detects a rotational position of an output shaft of the internal combustion engine; a unit angle rotation time computation module that computes a unit angle rotation time, as a time required for rotation of every preset unit rotational angle of the output shaft of the internal combustion engine, from the detected rotational position; and an engine misfire identification module. When the internal combustion engine is under warm-up acceleration control for accelerating warm-up of the emission control device, the engine misfire identification module divides multiple engine misfire patterns into at least two preset groups based on the computed unit angle rotation time and identifies a current engine misfire among the multiple engine misfire patterns. When the internal combustion engine is not under the warm-up acceleration control, the engine misfire identification module divides the multiple engine misfire patterns into plural groups different from the preset groups based on the computed unit angle rotation time and identifies the current engine misfire among the multiple engine misfire patterns.

When the multi-cylinder internal combustion engine is under the warm-up acceleration control for accelerating the warm-up of the emission control device attached to the exhaust system of the internal combustion engine for emission control, the engine misfire detection apparatus for the internal combustion engine according to one aspect of the invention computes the unit angle rotation time, as the time required for rotation of every preset unit rotational angle of the output shaft of the internal combustion engine, from the rotational position of the output shaft of the internal combustion engine, divides the multiple engine misfire patterns into at least two preset groups based on the computed unit angle rotation time, and identifies the current engine misfire among the multiple engine misfire patterns. When the internal combustion engine is not under the warm-up acceleration control, the engine misfire detection apparatus computes the unit angle rotation time, divides the multiple engine misfire patterns into plural groups different from the preset groups based on the computed unit angle rotation time, and identifies the current engine misfire among the multiple engine misfire patterns. This arrangement ensures accurate detection of misfires of the internal combustion engine, regardless of execution or completion of the warm-up acceleration control of the emission control device.

In the engine misfire detection apparatus of the invention, the multiple engine misfire patterns identified by the engine misfire identification module may include a single engine misfire pattern with only one misfired cylinder among the multiple cylinders of the internal combustion engine, a consecutive engine misfire pattern with two consecutive misfired cylinders among the multiple cylinders, and an intermittent engine misfire pattern with two misfired cylinders located across one fired cylinder among the multiple cylinders. Here, in one preferable embodiment of the engine misfire detection apparatus, when the internal combustion engine is under the warm-up acceleration control, the engine misfire identification module divides the multiple engine misfire patterns into a group of the single engine misfire pattern and the intermittent engine misfire pattern and a group of the consecutive engine misfire pattern based on the computed unit angle rotation time and identifies the current engine misfire among the multiple engine misfire patterns. When the internal combustion engine is not under the warm-up acceleration control, on the other hand, the engine misfire identification module divides the multiple engine misfire patterns into a group of the single engine misfire pattern and the consecutive engine misfire pattern and a group of the intermittent engine misfire pattern based on the computed unit angle rotation time and identifies the current engine misfire among the multiple engine misfire patterns. This arrangement ensures accurate and effective identification of a pattern of a misfire of the internal combustion engine, regardless of execution or completion of warm-up acceleration control of the emission control device.

In this preferable embodiment, when the internal combustion engine is under the warm-up acceleration control, the engine misfire identification module may identify the current engine misfire as the group of the consecutive engine misfire pattern in response to the computed unit angle rotation time that exceeds a preset first time, and identifies the current engine misfire as the group of the single engine misfire pattern and the intermittent engine misfire pattern in response to the computed unit angle rotation time that does not exceed the preset first time but exceeds a preset second time shorter than the first time. When the internal combustion engine is not under the warm-up acceleration control, the engine misfire identification module may identify the current engine misfire as the group of the intermittent engine misfire pattern in response to the computed unit angle rotation time that exceeds a preset third time, and identify the current engine misfire as the group of the single engine misfire pattern and the consecutive engine misfire pattern in response to the computed unit angle rotation time that does not exceed the preset third time but exceeds a preset fourth time shorter than the third time. This arrangement ensures accurate and effective identification of a pattern of a misfire of the internal combustion engine, during execution of warm-up acceleration control of the emission control device.

In the above preferable embodiment, when the internal combustion engine is under the warm-up acceleration control, the engine misfire identification module discriminates the group of the single engine misfire pattern and the intermittent engine misfire pattern from the group of the consecutive engine misfire pattern and may identify the current engine misfire between the single engine misfire pattern and the intermittent engine misfire pattern based on a preset angle difference of the computed unit angle rotation time. In this case, when the internal combustion engine is under the warm-up acceleration control, the engine misfire identification module discriminates the group of the single engine misfire pattern and the intermittent engine misfire pattern from the group of the consecutive engine misfire pattern and may identify the current engine misfire between the single engine misfire pattern and the intermittent engine misfire pattern based on either of a 360-degree difference and a 120-degree difference of the computed unit angle rotation time. In this case, furthermore, when the internal combustion engine is under the warm-up acceleration control, the engine misfire identification module discriminates the group of the single engine misfire pattern and the intermittent engine misfire pattern from the group of the consecutive engine misfire pattern and may identify the current engine misfire as the single engine misfire pattern in response to the 360-degree difference exceeding a preset first threshold value only once in a 720-degree range and the 120-degree difference exceeding a preset second threshold value only once in the 720-degree range, while identifying the current engine misfire as the intermittent engine misfire pattern in response to the 360-degree difference exceeding the preset first threshold value twice in the 720-degree range and the 120-degree difference exceeding the preset second threshold value twice in the 720-degree range. This arrangement ensures accurate and effective identification of a pattern of a misfire of the internal combustion engine, during execution of warm-up acceleration control of the emission control device.

In the above preferable embodiment, when the internal combustion engine is not under the warm-up acceleration control, the engine misfire identification module discriminates the group of the single engine misfire pattern and the consecutive engine misfire pattern from the group of the intermittent engine misfire pattern and may identify the current engine misfire between the single engine misfire pattern and the consecutive engine misfire pattern based on a preset angle difference of the computed unit angle rotation time. In this case, when the internal combustion engine is not under the warm-up acceleration control, the engine misfire identification module discriminates the group of the single engine misfire pattern and the consecutive engine misfire pattern from the group of the intermittent engine misfire pattern and may identify the current engine misfire between the single engine misfire pattern and the consecutive engine misfire pattern based on either of a 360-degree difference and a 120-degree difference of the computed unit angle rotation time. In this case, furthermore, when the internal combustion engine is not under the warm-up acceleration control, the engine misfire identification module discriminates the group of the single engine misfire pattern and the consecutive engine misfire pattern from the group of the intermittent engine misfire pattern and may identify the current engine misfire as the single engine misfire pattern based on patterns of the 360-degree difference and the 120-degree difference of the computed unit angle rotation time, while identifying the current engine misfire as the consecutive engine misfire pattern in response to failed identification as the single engine misfire pattern based on the patterns of the 360-degree difference and the 120-degree difference of the computed unit angle rotation time. This arrangement ensures accurate and effective identification of a pattern of a misfire of the internal combustion engine, during non-execution of warm-up acceleration control of the emission control device.

In the engine misfire detection apparatus of the invention, the engine misfire identification module may divide the multiple engine misfire patterns into the at least two groups based on the computed unit angle rotation time and identify the current engine misfire in one of the at least two groups based on a preset angle difference of the computed unit angle rotation time. This arrangement ensures accurate and effective identification of a pattern of a misfire of the internal combustion engine. Here, the preset angle difference may be either of a 360-degree difference and a 120-degree difference.

According to another aspect, the present invention is directed to an engine misfire detection method of detecting a misfire of a multi-cylinder internal combustion engine in a hybrid system where the internal combustion engine is equipped with an emission control device for emission control in an exhaust system. When the internal combustion engine is under warm-up acceleration control for accelerating warm-up of the emission control device, the engine misfire detection method computes a unit angle rotation time, as a time required for rotation of every preset unit rotational angle of an output shaft of the internal combustion engine, from a rotational position of the output shaft of the internal combustion engine, divides multiple engine misfire patterns into at least two preset groups based on the computed unit angle rotation time, and identifies a current engine misfire among the multiple engine misfire patterns. When the internal combustion engine is not under the warm-up acceleration control, the engine misfire detection method computes the unit angle rotation time, divides the multiple engine misfire patterns into plural groups different from the preset groups based on the computed unit angle rotation time, and identifies the current engine misfire among the multiple engine misfire patterns.

When the multi-cylinder internal combustion engine is under the warm-up acceleration control for accelerating the warm-up of the emission control device attached to the exhaust system of the internal combustion engine for emission control, the engine misfire detection method for the internal combustion engine of the invention computes the unit angle rotation time, as the time required for rotation of every preset unit rotational angle of the output shaft of the internal combustion engine, from the rotational position of the output shaft of the internal combustion engine, divides the multiple engine misfire patterns into at least two preset groups based on the computed unit angle rotation time, and identifies the current engine misfire among the multiple engine misfire patterns. When the internal combustion engine is not under the warm-up acceleration control, the engine misfire detection method computes the unit angle rotation time, divides the multiple engine misfire patterns into plural groups different from the preset groups based on the computed unit angle rotation time, and identifies the current engine misfire among the multiple engine misfire patterns. This arrangement ensures accurate detection of misfires of the internal combustion engine, regardless of execution or completion of the warm-up acceleration control of the emission control device.

In one preferable embodiment of the engine misfire detection method of the invention, the multiple engine misfire patterns include a single engine misfire pattern with only one misfired cylinder among the multiple cylinders of the internal combustion engine, a consecutive engine misfire pattern with two consecutive misfired cylinders among the multiple cylinders, and an intermittent engine misfire pattern with two misfired cylinders located across one fired cylinder among the multiple cylinders. In this preferable embodiment, when the internal combustion engine is under the warm-up acceleration control, the engine misfire detection method divides the multiple engine misfire patterns into a group of the single engine misfire pattern and the intermittent engine misfire pattern and a group of the consecutive engine misfire pattern based on the computed unit angle rotation time and identifies the current engine misfire among the multiple engine misfire patterns. When the internal combustion engine is not under the warm-up acceleration control, the engine misfire detection method dividing the multiple engine misfire patterns into a group of the single engine misfire pattern and the consecutive engine misfire pattern and a group of the intermittent engine misfire pattern based on the computed unit angle rotation time and identifying the current engine misfire among the multiple engine misfire patterns.

In this preferable embodiment, when the internal combustion engine is under the warm-up acceleration control, the engine misfire identification method may identify the current engine misfire as the group of the consecutive engine misfire pattern in response to the computed unit angle rotation time that exceeds a preset first time, and identify the current engine misfire as the group of the single engine misfire pattern and the intermittent engine misfire pattern in response to the computed unit angle rotation time that does not exceed the preset first time but exceeds a preset second time shorter than the first time, and when the internal combustion engine is not under the warm-up acceleration control, the engine misfire identification method may identify the current engine misfire as the group of the intermittent engine misfire pattern in response to the computed unit angle rotation time that exceeds a preset third time, and identify the current engine misfire as the group of the single engine misfire pattern and the consecutive engine misfire pattern in response to the computed unit angle rotation time that does not exceed the preset third time but exceeds a preset fourth time shorter than the third time.

In the above preferable embodiment, when the internal combustion engine is under the warm-up acceleration control, the engine misfire detection method discriminates the group of the single engine misfire pattern and the intermittent engine misfire pattern from the group of the consecutive engine misfire pattern and may identify the current engine misfire between the single engine misfire pattern and the intermittent engine misfire pattern based on a preset angle difference of the computed unit angle rotation time. In this case, when the internal combustion engine is under the warm-up acceleration control, the engine misfire detection method discriminates the group of the single engine misfire pattern and the intermittent engine misfire pattern from the group of the consecutive engine misfire pattern and may identify the current engine misfire between the single engine misfire pattern and the intermittent engine misfire pattern based on either of a 360-degree difference and a 120-degree difference of the computed unit angle rotation time. In this case, furthermore, when the internal combustion engine is under the warm-up acceleration control, the engine misfire detection method discriminates the group of the single engine misfire pattern and the intermittent engine misfire pattern from the group of the consecutive engine misfire pattern and may identify the current engine misfire as the single engine misfire pattern in response to the 360-degree difference exceeding a preset first threshold value only once in a 720-degree range and the 120-degree difference exceeding a preset second threshold value only once in the 720-degree range, while identifying the current engine misfire as the intermittent engine misfire pattern in response to the 360-degree difference exceeding the preset first threshold value twice in the 720-degree range and the 120-degree difference exceeding the preset second threshold value twice in the 720-degree range. This arrangement ensures accurate and effective identification of a pattern of a misfire of the internal combustion engine, during execution of warm-up acceleration control of the emission control device.

In the above preferable embodiment, when the internal combustion engine is not under the warm-up acceleration control, the engine misfire detection method discriminates the group of the single engine misfire pattern and the consecutive engine misfire pattern from the group of the intermittent engine misfire pattern and may identify the current engine misfire between the single engine misfire pattern and the consecutive engine misfire pattern based on a preset angle difference of the computed unit angle rotation time. In this case, when the internal combustion engine is not under the warm-up acceleration control, the engine misfire detection method discriminates the group of the single engine misfire pattern and the consecutive engine misfire pattern from the group of the intermittent engine misfire pattern and may identify the current engine misfire between the single engine misfire pattern and the consecutive engine misfire pattern based on either of a 360-degree difference and a 120-degree difference of the computed unit angle rotation time. In this case, furthermore, when the internal combustion engine is not under the warm-up acceleration control, the engine misfire detection method discriminates the group of the single engine misfire pattern and the consecutive engine misfire pattern from the group of the intermittent engine misfire pattern and may identify the current engine misfire as the single engine misfire pattern based on patterns of the 360-degree difference and the 120-degree difference of the computed unit angle rotation time, while identifying the current engine misfire as the consecutive engine misfire pattern in response to failed identification as the single engine misfire pattern based on the patterns of the 360-degree difference and the 120-degree difference of the computed unit angle rotation time. This arrangement ensures accurate and effective identification of a pattern of a misfire of the internal combustion engine, during non-execution of warm-up acceleration control of the emission control device.

In the engine misfire detection method of the invention, the engine misfire detection method may divide the multiple engine misfire patterns into the at least two groups based on the computed unit angle rotation time and identify the current engine misfire in one of the at least two groups based on a preset angle difference of the computed unit angle rotation time. This arrangement ensures accurate and effective identification of a pattern of a misfire of the internal combustion engine. Here, the preset angle difference may be either of a 360-degree difference and a 120-degree difference.

BEST MODES OF CARRYING OUT THE INVENTION

Figure 1:
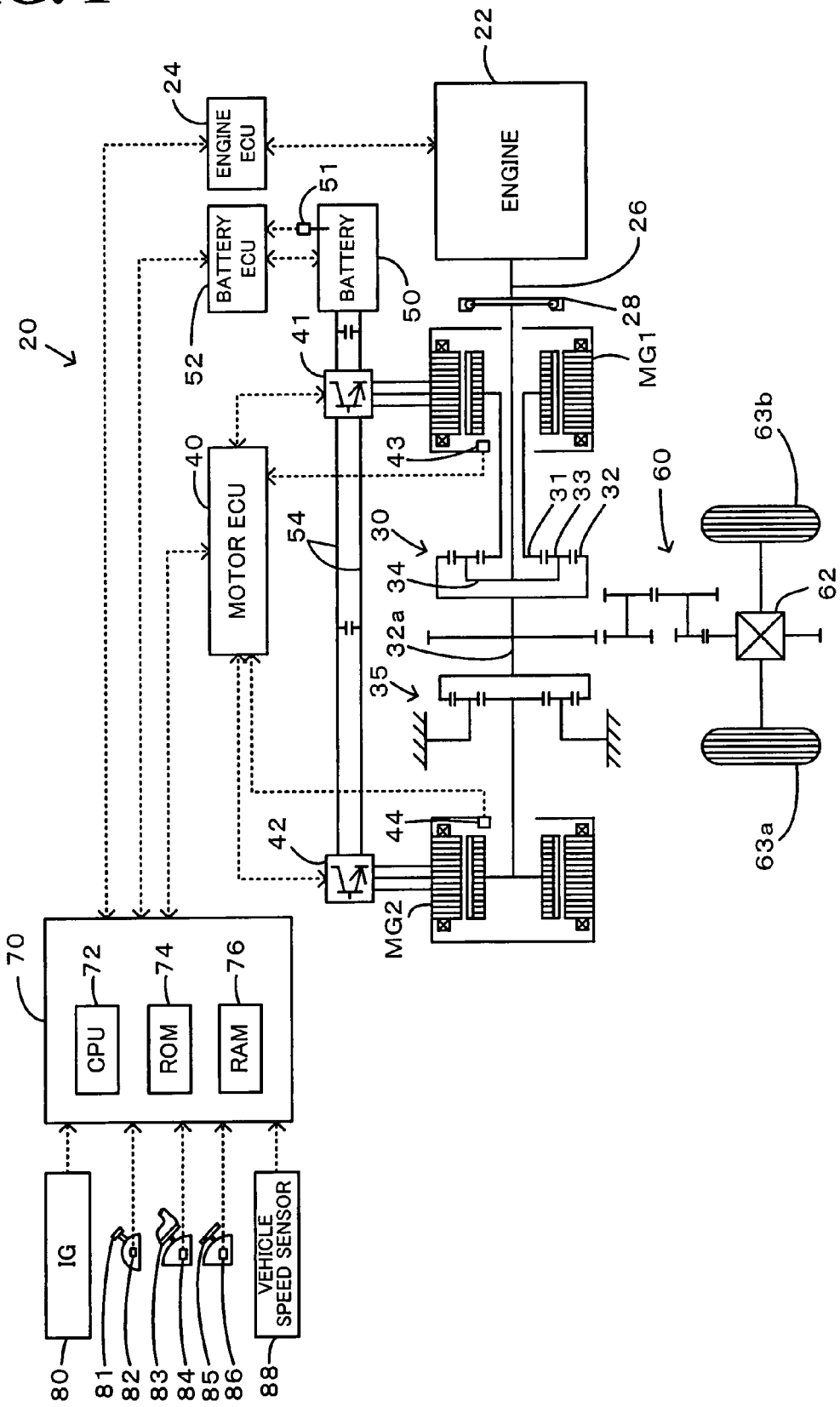
FIG. 1 schematically illustrates the configuration of a hybrid vehicle 20 in one embodiment of the invention.

One mode of carrying out the invention is described below as a preferred embodiment with reference to the accompanied drawings. FIG. 1 schematically illustrates the configuration of a hybrid vehicle 20 equipped with an engine misfire detection apparatus for an internal combustion engine in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28 as a torsional element, a motor MG1 that is linked to the power distribution integration mechanism 30 and has power generation capability, a reduction gear 35 that is attached to a ring gear shaft 32a or a driveshaft connected to the power distribution integration mechanism 30, a motor MG2 that is linked with the reduction gear 35, and a hybrid electronic control unit 70 that controls the operations of the whole hybrid vehicle 20. In the hybrid vehicle 20 of this embodiment, an engine electronic control unit 24 for controlling the operations of the engine 22 substantially works as the engine misfire detection apparatus for the internal combustion engine.

Figure 2:
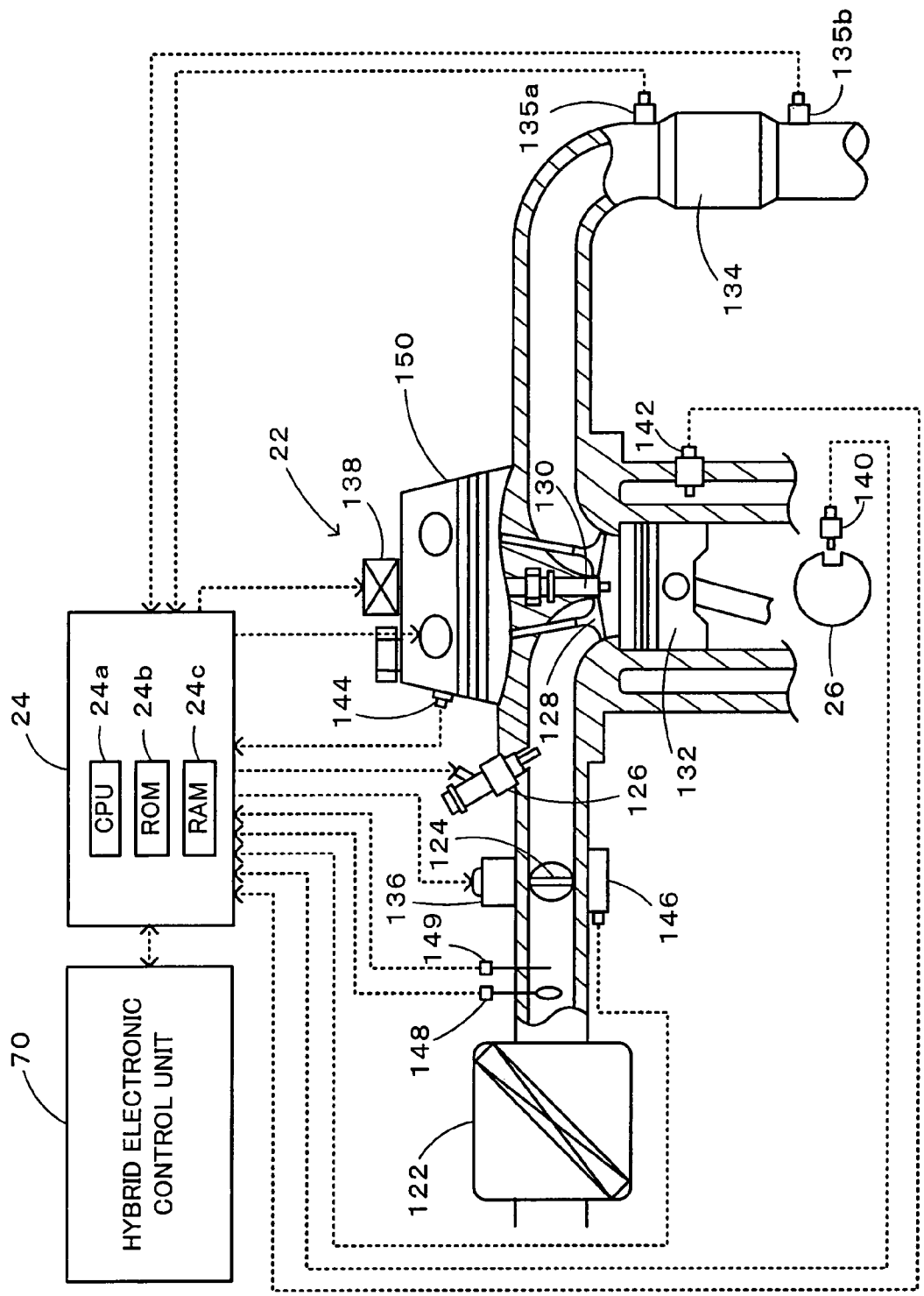
FIG. 2 schematically illustrates the configuration of an engine 22.

The engine 22 is a six-cylinder internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 provided for each cylinder to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through an emission control device (filled with a three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under operation control of the engine electronic control unit (hereafter referred to as engine ECU) 24. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the position of the throttle valve 124, an air flow meter signal from an air flow meter 148 attached to an air intake conduit, an intake air temperature from a temperature sensor 149 attached to the air intake conduit, an air-fuel ratio AF of the air-fuel mixture from an air fuel ratio sensor 135a, and an oxygen signal from an oxygen sensor 135b. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the operating conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with a surplus of the power generated by the motors MG1 and MG2, while being discharged to compensate for an insufficiency of the power generated by the motors MG1 and MG2. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment constructed as described above sets a torque demand to be output to the ring gear shaft 32a or the driveshaft, based on the vehicle speed V and the accelerator opening Acc (corresponding to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
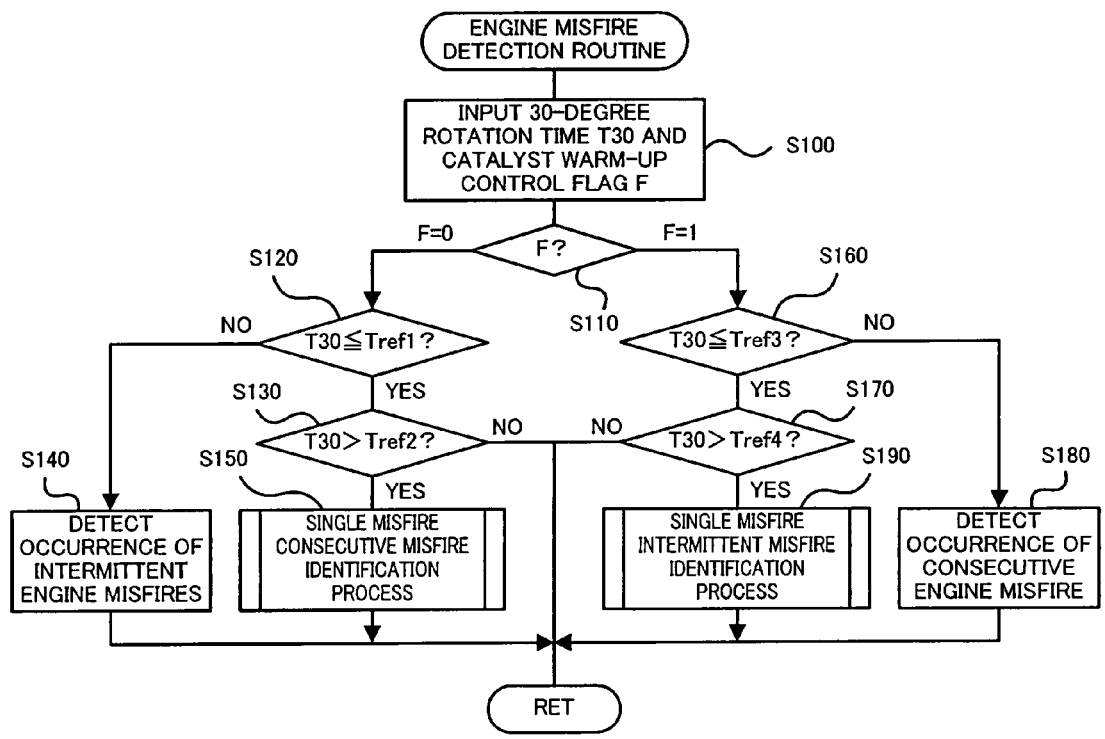
FIG. 3 is a flowchart showing an engine misfire detection routine executed by an engine ECU24.

The description regards a series of operations to detect a misfire in any of the cylinders of the engine 22 mounted on the hybrid vehicle 20 of the embodiment constructed as described above. FIG. 3 is an engine misfire detection routine executed by the engine ECU 24. This engine misfire detection routine is performed repeatedly at preset time intervals.

Figure 4:
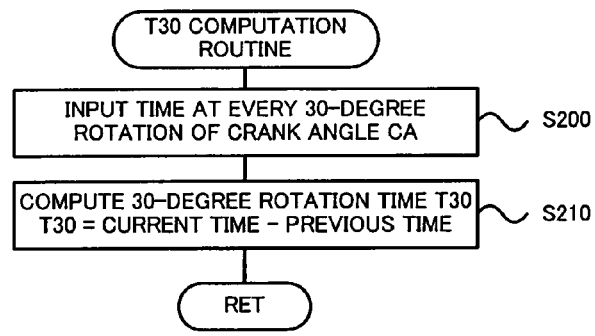
FIG. 4 is a flowchart showing a T30 computation routine.

In the engine misfire detection routine, the CPU 24a of the engine ECU 24 first inputs a 30-degree rotation time T30 computed as a time required for a 30-degree rotation of the crankshaft 26, and a catalyst warm-up control flag F identifying execution or non-execution of catalyst warm-up acceleration control for accelerating warm-up of the catalyst in the emission control device 134 (step S100). The 30-degree rotation time T30 is computed according to a T30 computation routine shown in the flowchart of FIG. 4. The T30 computation routine of FIG. 4 successively inputs the time at every 30-degree rotation of the crank angle CA detected by the crank position sensor 140 (step S200) and computes the 30-degree rotation time T30 as a difference between the current time input at a current 30-degree rotation of the crank angle CA and the previous time input at a previous 30-degree rotation of the crank angle CA (step S210). The catalyst warm-up flag F is set to 1 by the hybrid electronic control unit 70 when a permission for control of accelerating the warm-up of the catalyst in the emission control device 134 or catalyst warm-up acceleration control is given in the case of uncompleted warm-up of the catalyst. The catalyst warm-up flag F is set to 0 by the hybrid electronic control unit 70, on the other hand, when the warm-up of the catalyst has been completed or when the permission for catalyst warm-up acceleration control is not given in the case of uncompleted warm-up of the catalyst. The setting of the catalyst warm-up flag F is input from the hybrid electronic control unit 70 by communication.

Figure 5:
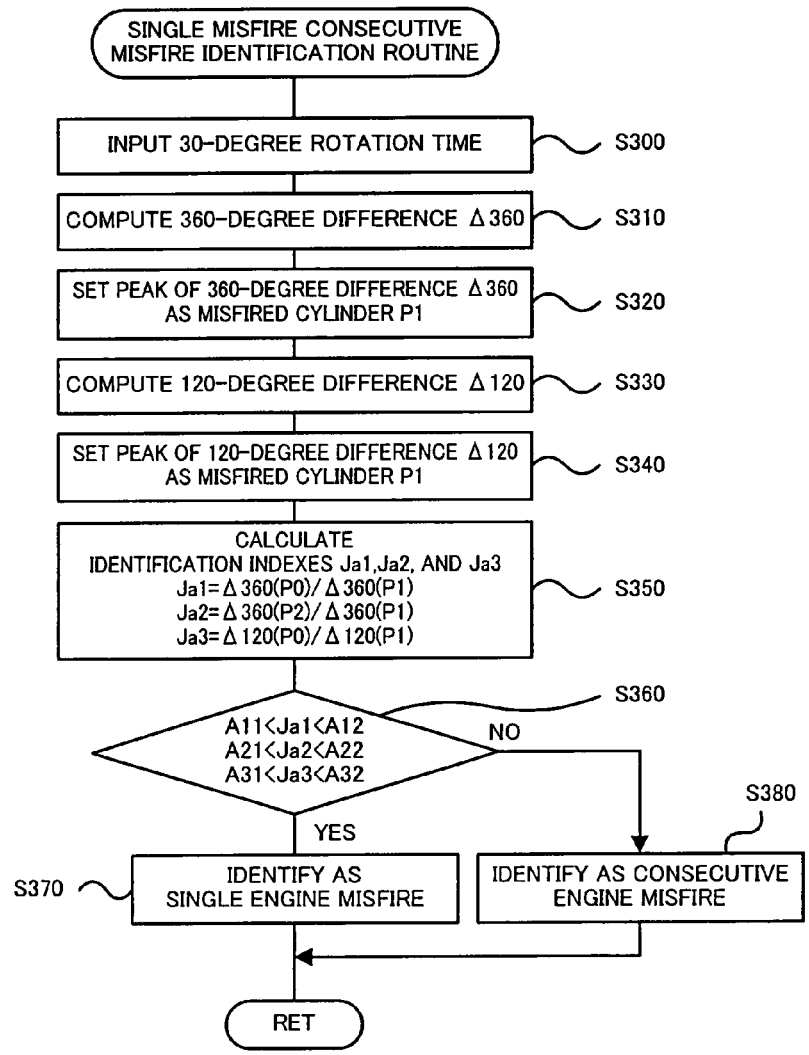
FIG. 5 is a flowchart showing a single misfire consecutive misfire identification routine.

The CPU 24a subsequently checks the value of the input catalyst warm-up control flag F (step S110). When the catalyst warm-up control flag F is equal to 0, that is, in the case of non-execution of the catalyst warm-up acceleration control, the input 30-degree rotation time T30 is compared sequentially with preset reference values Tref1 and Tref2 (steps S120 and S130). The reference value Tref1 is greater than the reference value Tref2 and is used as a criterion for detecting intermittent engine misfires with two misfired cylinders located across one fired cylinder among the six cylinders of the engine 22 in the case of non-execution of the catalyst warm-up acceleration control. The reference value Tref2 is used as a criterion for detecting either a single engine misfire with only one misfired cylinder among the six cylinders of the engine 22 or consecutive engine misfires with two consecutive misfired cylinders among the six cylinders of the engine 22 in the case of non-execution of the catalyst warm-up acceleration control. These reference values Tref1 and Tref2 are experimentally or otherwise determined. When the 30-degree rotation time T30 is greater than the reference value Tref1, the CPU 24a detects the occurrence of the intermittent engine misfires (step S140) and exits from the engine misfire detection routine. When the 30-degree rotation time T30 is not greater than the reference value Tref1 but is greater than the reference value Tref2, the CPU 24a detects the occurrence of either the single engine misfire or the consecutive engine misfires, executes a single misfire consecutive misfire identification routine shown in the flowchart of FIG. 5 to identify a current engine misfire pattern either as the single engine misfire or as the consecutive engine misfires (step S150), and exits from the engine misfire detection routine.

Figure 6:
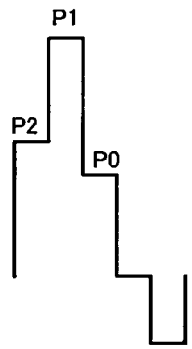
FIG. 6 shows a variation in 360-degree difference Δ360 in a 720-degree range of a crank angle CA.

The single misfire consecutive misfire identification routine first inputs the 30-degree rotation time T30 (step S300), computes a 360-degree difference $\Delta 360$ of the input 30-degree rotation times T30 (step S310), and sets a peak of the computed 360-degree difference $\Delta 360$ as a misfired cylinder P1 (step S320). In the six-cylinder engine, explosive combustion of the air-fuel mixture takes place at the crank angle CA of every 120 degrees. The 360-degree difference $\Delta 360$ between a large 30-degree rotation time T30 for a misfired cylinder and a small 30-degree rotation time T30 for a normally fired cylinder is greater than the 360-degree difference $\Delta 360$ between 30-degree rotation times T30 for two normally fired cylinders. A peak of the 360-degree difference $\Delta 360$ thus substantially corresponds to a misfired cylinder. In this embodiment, the peak of the 360-degree difference $\Delta 360$ is set as the misfired cylinder P1($\Delta 360$). FIG. 6 shows a variation in 360-degree difference $\Delta 360$ in a 720-degree range of the crank angle CA. In the illustrated example of FIG. 6, a cylinder corresponding to the peak of the 360-degree difference $\Delta 360$ is specified as the misfired cylinder P1. A cylinder explosively combusted immediately before the misfired cylinder P1 is shown as a pre-misfire cylinder P0. A cylinder explosively combusted immediately after the misfired cylinder P1 is shown as a post-misfire cylinder P2. The single misfire consecutive misfire identification routine subsequently computes a 120-degree difference $\Delta 120$ of the input 30-degree rotation times T30 (step S330) and sets a peak of the computed 120-degree difference $\Delta 120$ as a misfired cylinder P1 (step S340) in the same manner as the peak of the 360-degree difference $\Delta 360$. In the six-cylinder engine, explosive combustion of the air-fuel mixture takes place at the crank angle CA of every 120 degrees as mentioned previously. The 120-degree difference $\Delta 120$ between a large 30-degree rotation time T30 for a misfired cylinder and a small 30-degree rotation time T30 for a normally fired cylinder is greater than the 120-degree difference $\Delta 120$ between 30-degree rotation times T30 for two normally fired cylinders. A peak of the 120-degree difference $\Delta 120$ thus substantially corresponds to a misfired cylinder. In this embodiment, the peak of the 120-degree difference $\Delta 120$ is set as the misfired cylinder P1($\Delta 120$). The 120-degree difference $\Delta 120$ in the 720-degree range of the crank angle CA has a similar variation pattern to that of the 360-degree difference $\Delta 360$ shown in FIG. 6.

Identification indexes Ja1, Ja2, and Ja3 are then calculated (step S350). The identification index Ja1 is a ratio $\Delta 360(P0)/\Delta 360(P1)$ of a 360-degree difference $\Delta 360(P0)$ of the pre-misfire cylinder P0 explosively combusted immediately before the misfired cylinder P1 to the 360-degree difference $\Delta 360(P1)$ of the misfired cylinder P1. The identification index Ja2 is a ratio $\Delta 360(P2)/\Delta 360(P1)$ of a 360-degree difference $\Delta 360(P2)$ of the post-misfire cylinder P2 explosively combusted immediately after the misfired cylinder P1 to the 360-degree difference $\Delta 360(P1)$ of the misfired cylinder P1. The identification index Ja3 is a ratio $\Delta 120(P0)/\Delta 120(P1)$ of a 120-degree difference $\Delta 120(P0)$ of the pre-misfire cylinder P0 explosively combusted immediately before the misfired cylinder P1 to the 120-degree difference $\Delta 120(P1)$ of the misfired cylinder P1. It is then determined respectively whether the calculated identification index Ja1 is in a range defined by threshold values A11 and A12, whether the calculated identification index Ja2 is in a range defined by threshold values A21 and A22, and whether the calculated identification index Ja3 is in a range defined by threshold values A31 and A32 (step S360). The threshold values A11 and A12 are given as a lower limit and an upper limit in a single misfire range of the ratio $\Delta 360(P0)/\Delta 360(P1)$ of the 360-degree difference $\Delta 360(P0)$ of the pre-misfire cylinder P0 explosively combusted immediately before the misfired cylinder P1 to the 360-degree difference $\Delta 360(P1)$ of the misfired cylinder P1. The threshold values A21 and A22 are given as a lower limit and an upper limit in a single misfire range of the ratio $\Delta 360(P2)/\Delta 360(P1)$ of the 360-degree difference $\Delta 360(P2)$ of the post-misfire cylinder P2 explosively combusted immediately after the misfired cylinder P1 to the 360-degree difference $\Delta 360(P1)$ of the misfired cylinder P1. The threshold values A31 and A32 are given as a lower limit and an upper limit in a single misfire range of the ratio $\Delta 120(P0)/\Delta 120(P1)$ of the 120-degree difference $\Delta 120(P0)$ of the pre-misfire cylinder P0 explosively combusted immediately before the misfired cylinder P1 to the 120-degree difference Δ120(P1) of the misfired cylinder P1. These threshold values A11, A12, A21, A22, A31, and A32 are experimentally or otherwise determined. The occurrence of the single engine misfire is detected, based on the determination results of step S360. When the calculated identification indexes Ja1, Ja2, and Ja3 are respectively in the range defined by the threshold values A11 and A12, in the range defined by the threshold values A21 and A22, and in the range defined by the threshold values A31 and A32, the CPU 24a identifies the current engine misfire pattern as the single engine misfire (step S370) and terminates the single misfire consecutive misfire identification routine. When any of the calculated identification indexes Ja1, Ja2, and Ja3 is out of the range defined by the threshold values A11 and A12, the range defined by the threshold values A21 and A22, or the range defined by the threshold values A31 and A32, the CPU 24a identifies the current engine misfire pattern not as the single engine misfire but as the consecutive engine misfires (step S380) and terminates the single misfire consecutive misfire identification routine.

Figure 7:
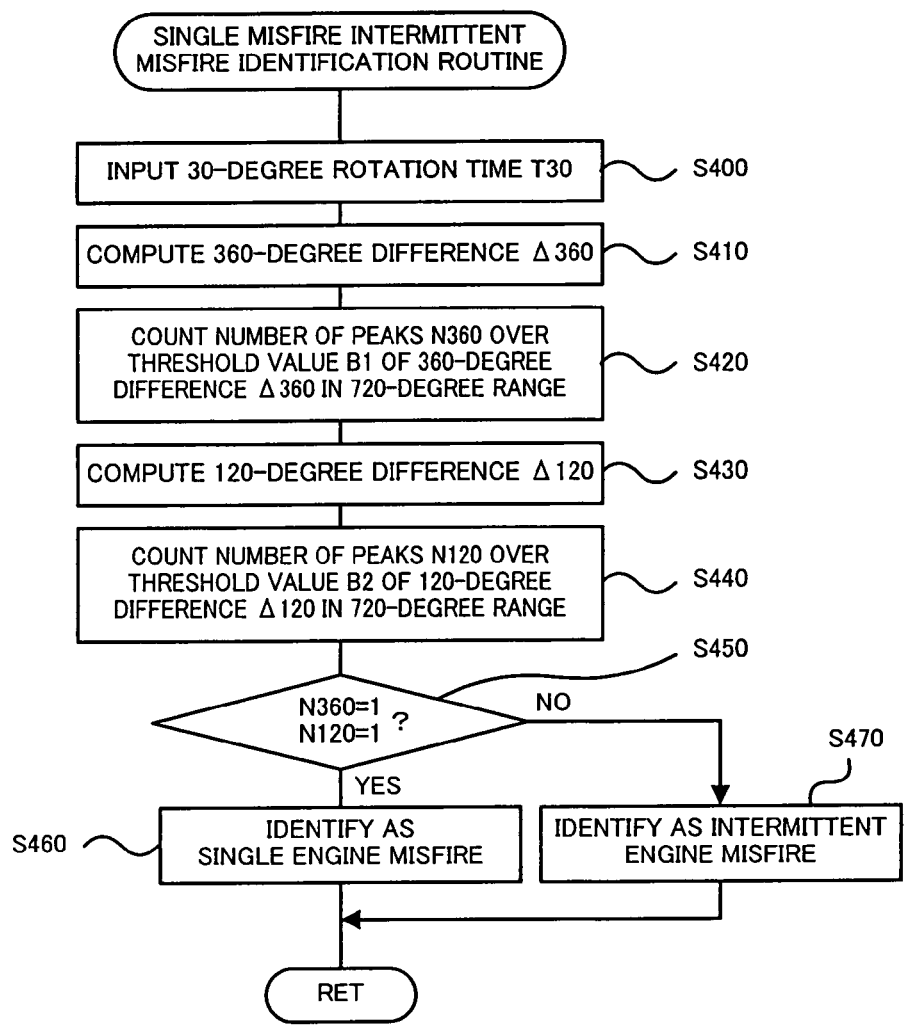
FIG. 7 is a flowchart showing a single misfire intermittent misfire identification routine.

Referring back to the engine misfire detection routine of FIG. 3, when the catalyst warm-up control flag F is equal to 1 at step S110, that is, during execution of the catalyst warm-up acceleration control, the input 30-degree rotation time T30 is compared sequentially with preset reference values Tref3 and Tref4 (steps S160 and S170). The reference value Tref3 is greater than the reference value Tref4 and is used as a criterion for detecting the consecutive engine misfires with two consecutive misfired cylinders among the six cylinders of the engine 22 during execution of the catalyst warm-up acceleration control. The reference value Tref4 is used as a criterion for detecting either the single engine misfire with only one misfired cylinder among the six cylinders of the engine 22 or the intermittent engine misfires with two misfired cylinders located across one fired cylinder among the six cylinders of the engine 22 during execution of the catalyst warm-up acceleration control. These reference values Tref3 and Tref4 are experimentally or otherwise determined. The reference values Tref3 and Tref4 may be respectively equal to or different from the reference values Tref1 and Tref2. When the 30-degree rotation time T30 is greater than the reference value Tref3, the CPU 24a detects the occurrence of the consecutive engine misfires (step S180) and exits from the engine misfire detection routine. When the 30-degree rotation time T30 is not greater than the reference value Tref3 but is greater than the reference value Tref4, the CPU 24a detects the occurrence of either the single engine misfire or the intermittent engine misfires, executes a single misfire intermittent misfire identification routine shown in the flowchart of FIG. 7 to identify a current engine misfire pattern either as the single engine misfire or as the intermittent engine misfires (step S190), and exits from the engine misfire detection routine.

The single misfire intermittent misfire identification routine first inputs the 30-degree rotation time T30 (step S400), computes the 360-degree difference Δ360 of the input 30-degree rotation times T30 (step S410), and counts the number of peaks N360 exceeding a preset threshold value B1 of the 360-degree difference Δ360 in the 720-degree range of the crank angle CA (step S420). As mentioned previously, the misfired cylinder has a large 360-degree difference Δ360 in the six-cylinder engine. The number of peaks N360 accordingly represents the number of misfired cylinders among the six cylinders. The threshold value B1 is set to be smaller than the 360-degree difference Δ360 for the misfired cylinder in the occurrence of the single engine misfire or the intermittent engine misfires but to be greater than the 360-degree difference Δ360 for the normally fired cylinder in the occurrence of the single engine misfire or the intermittent engine misfires. The threshold value B1 is experimentally or otherwise determined.

The single misfire intermittent misfire identification routine subsequently computes the 120-degree difference Δ120 of the input 30-degree rotation times T30 (step S430) and counts the number of peaks N120 exceeding a preset threshold value B2 of the 120-degree difference Δ120 in the 720-degree range of the crank angle CA (step S440). As mentioned previously, the misfired cylinder has a large 120-degree difference Δ120 in the six-cylinder engine. The number of peaks N120 accordingly represents the number of misfired cylinders among the six cylinders, like the number of peaks N360. The threshold value B2 is set to be smaller than the 120-degree difference Δ120 for the misfired cylinder in the occurrence of the single engine misfire or the intermittent engine misfires but to be greater than the 120-degree difference Δ120 for the normally fired cylinder in the occurrence of the single engine misfire or the intermittent engine misfires. The threshold value B2 is experimentally or otherwise determined.

Figure 8:
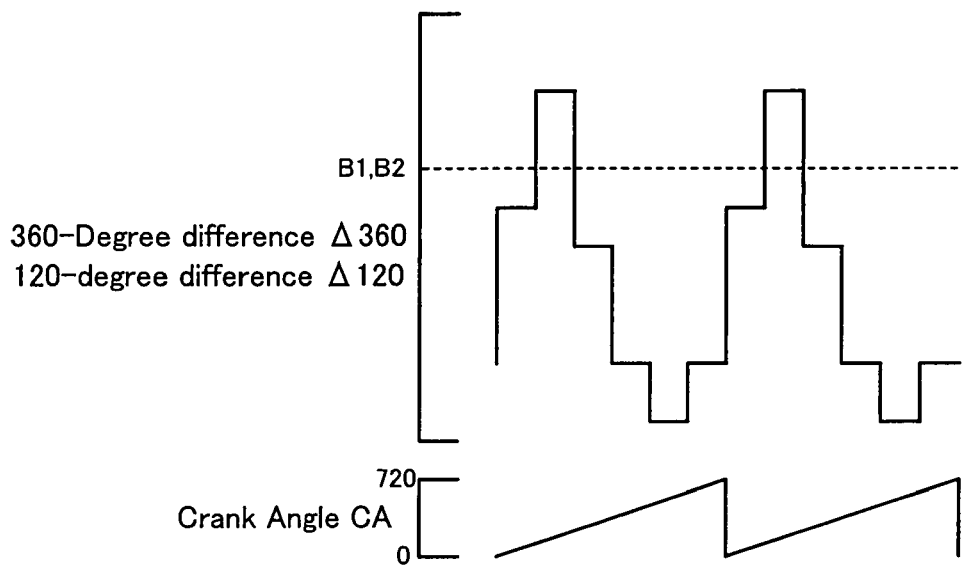
FIG. 8 shows variations in 360-degree difference Δ360 and in 120-degree difference Δ120 against the crank angle CA in the case of single engine misfire.
Figure 9:
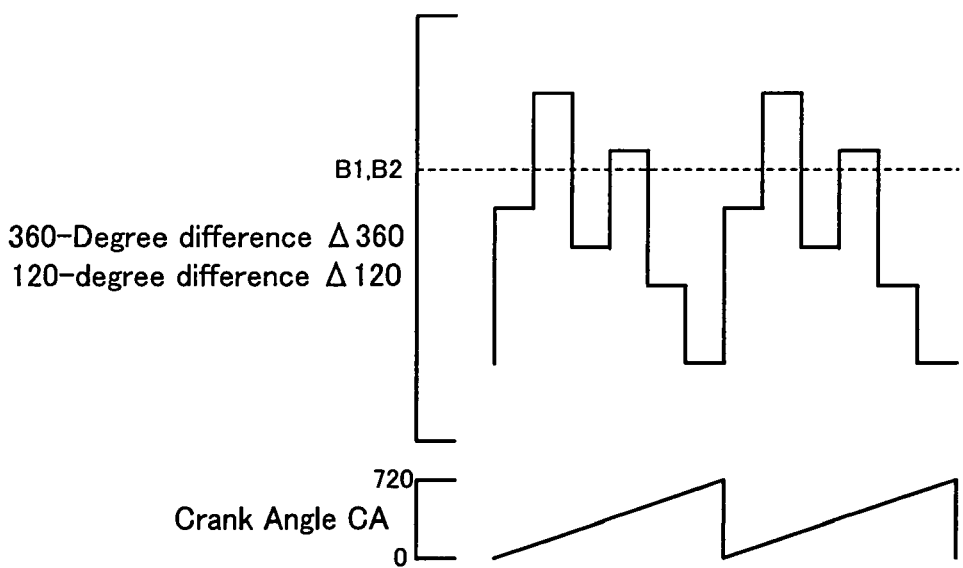
FIG. 9 shows variations in 360-degree difference Δ360 and in 120-degree difference Δ120 against the crank angle CA in the case of intermittent engine misfires.

It is then determined successively whether the number of peaks N360 with regard to the 360-degree difference Δ360 is equal to 1 and whether the number of peaks N120 with regard to the 120-degree difference Δ120 is equal to 1 (step S450). When both the number of peaks N360 and the number of peaks N120 are equal to 1, the CPU 24a identifies the current engine misfire pattern as the single engine misfire (step S460) and terminates the single misfire intermittent misfire identification routine. When neither the number of peaks N360 nor the number of peaks N120 is equal to 1, on the other hand, the CPU 24a identifies the current engine misfire pattern as the intermittent engine misfires (step S470) and terminates the single misfire intermittent misfire identification routine. FIG. 8 shows variations in 360-degree difference Δ360 and in 120-degree difference Δ120 against the crank angle CA in the case of the single engine misfire. FIG. 9 shows variations in 360-degree difference Δ360 and in 120-degree difference Δ120 against the crank angle CA in the case of the intermittent engine misfires. As clearly shown in these graphs, the number of peaks N360 and the number of peaks N120 are both equal to 1 in the case of the single engine misfire. The number of peaks N360 and the number of peaks N120 are both equal to 2 in the case of the intermittent engine misfires.

As described above, the engine misfire detection apparatus for the internal combustion engine mounted on the hybrid vehicle 20 of the embodiment compares the 30-degree rotation time T30 computed as the time required for a 30-degree rotation of the crankshaft 26 with the preset reference values Tref1 and Tref2 and distinctly detects the occurrence of the intermittent engine misfires and the occurrence of either the single engine misfire or the consecutive engine misfires, in the case of non-execution of the catalyst warm-up acceleration control. During execution of the catalyst warm-up acceleration control, on the other hand, the engine misfire detection apparatus compares the 30-degree rotation time T30 computed as the time required for a 30-degree rotation of the crankshaft 26 with the preset reference values Tref3 and Tref4 and distinctly detects the occurrence of the consecutive engine misfires and the occurrence of either the single engine misfire or the intermittent engine misfires. This arrangement ensures accurate detection of misfires of the engine 22, regardless of execution or non-execution of the catalyst warm-up acceleration control. In the case of non-execution of the catalyst warm-up acceleration control, the single engine misfire is discriminated from the consecutive engine misfires, based on the 360-degree difference Δ360 and the 120-degree difference Δ120 of the 30-degree rotation times T30. In the case of execution of the catalyst warm-up acceleration control, on the other hand, the single engine misfire is discriminated from the intermittent engine misfires, based on the 360-degree difference Δ360 and the 120-degree difference Δ120 of the 30-degree rotation times T30. This arrangement ensures accurate and effective identification of misfires of the engine 22, regardless of execution or non-execution of the catalyst warm-up acceleration control.

In the engine misfire detection apparatus for the internal combustion engine mounted on the hybrid vehicle 20 of the embodiment, in the case of non-execution of the catalyst warm-up acceleration control, the engine misfire detection procedure distinctly detects the occurrence of either the single engine misfire or the consecutive engine misfires from the occurrence of the intermittent engine misfires and determines whether the identification indexes Ja1, Ja2, and Ja3 are respectively in the range between the threshold values A11 and A12, in the range between the threshold values A21 and A22, and in the range between the threshold values A31 and A32 to identify the current engine misfire pattern as the single engine misfire or the consecutive engine misfires. One possible modification may omit any one of these identification indexes Ja1, Ja2, and Ja3 and use the remaining two identification indexes for identification between the single engine misfire and the consecutive engine misfires. Another possible modification may omit any two of these identification indexes Ja1, Ja2, and Ja3 and use the remaining one identification index for identification between the single engine misfire and the consecutive engine misfires. The identification indexes Ja1, Ja2, and Ja3 are not restrictive but may be replaced by any other suitable identification indexes for identification between the single engine misfire and the consecutive engine misfires.

In the engine misfire detection apparatus for the internal combustion engine mounted on the hybrid vehicle 20 of the embodiment, in the case of execution of the catalyst warm-up acceleration control, the engine misfire detection procedure discriminates the single engine misfire from the intermittent engine misfires, based on the number of peaks N360 with regard to the 360-degree difference Δ360 and the number of peaks N120 with regard to the 120-degree difference Δ120 in the 720-degree range of the crank angle CA. One possible modification may discriminate the single engine misfire from the intermittent engine misfires, based on only the number of peaks N360 with regard to the 360-degree difference Δ360 in the 720-degree range of the crank angle CA. Another possible modification may discriminate the single engine misfire from the intermittent engine misfires, based on only the number of peaks N120 with regard to the 120-degree difference Δ120 in the 720-degree range of the crank angle CA. The number of peaks N360 with regard to the 360-degree difference Δ360 and the number of peaks N120 with regard to the 120-degree difference Δ120 in the 720-degree range of the crank angle CA are not restrictive but may be replaced by any other suitable indexes for identification between the single engine misfire and the intermittent engine misfires.

Figure 10:
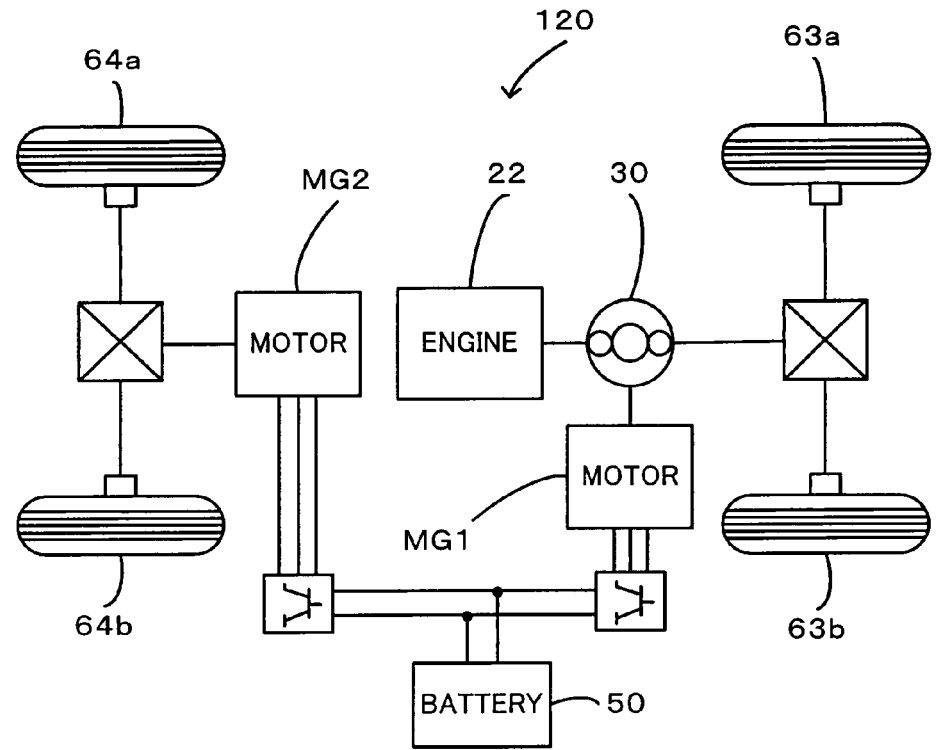
FIG. 10 schematically illustrates a hybrid vehicle 120 of a modified structure.
Figure 11:
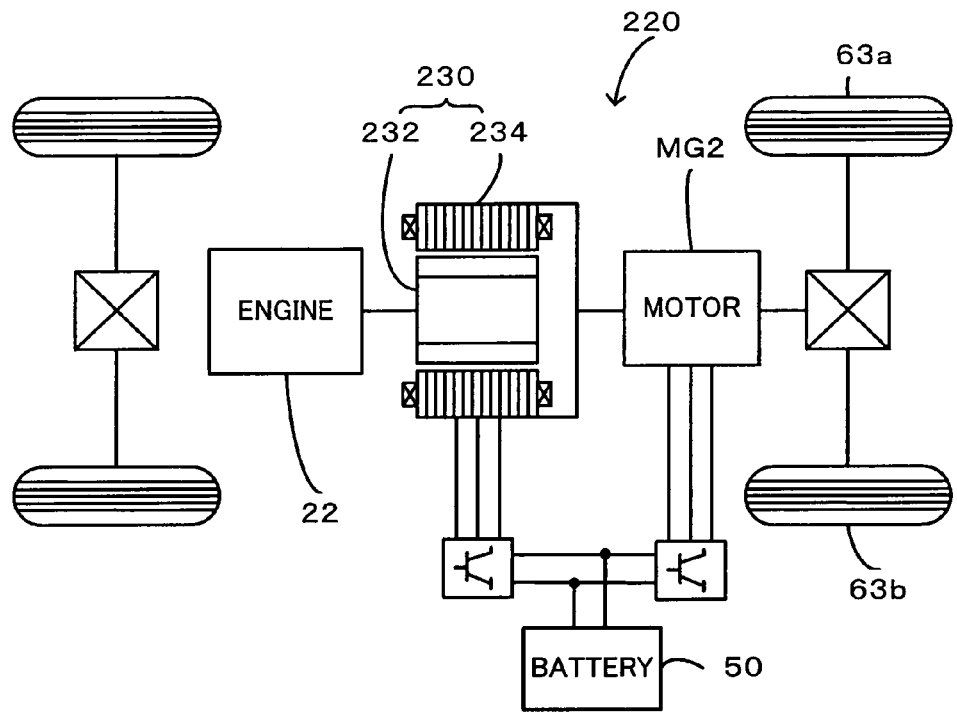
FIG. 11 schematically illustrates a hybrid vehicle 120 of another modified structure.

The embodiment regards the engine misfire detection apparatus for the engine 22 mounted on the hybrid vehicle 20, which is equipped with the power distribution integration mechanism 30 connected to the crankshaft 26 of the engine 22, to the rotating shaft of the motor MG1, and to the ring gear shaft 32a or the driveshaft and with the motor MG2 connected to the ring gear shaft 32a via the reduction gear 35. The engine misfire detection apparatus for the engine 22 may be mounted on a hybrid vehicle 120 of a modified structure shown in FIG. 10. In the hybrid vehicle 120 of FIG. 10, the power of the motor MG2 is connected to another axle (an axle linked with wheels 64a and 64b) that is different from the axle connecting with the ring gear shaft 32a (the axle linked with the drive wheels 63a and 63b). The engine misfire detection apparatus for the engine 22 may also be mounted on a hybrid vehicle 220 of another modified structure shown in FIG. 11. The hybrid vehicle 220 of FIG. 11 is equipped with a pair-rotor motor 230. The pair-rotor motor 230 includes an inner rotor 232 connected to the crankshaft 26 of the engine 22 and an outer rotor 234 connected to a driveshaft for power output to the drive wheels 63a and 63b. The pair-rotor motor 230 transmits part of the output power of the engine 22 to the driveshaft, while converting the residual engine output power into electric power.

The technique of the invention is not restricted to the engine misfire detection apparatus for the internal combustion engine mounted on the hybrid vehicle but may be actualized as the engine misfire detection apparatus for the internal combustion engine mounted on any of various vehicles and other moving bodies as well as for the internal combustion engine built in any of construction equipment and other stationary machinery. Another application of the invention is an engine misfire detection method for the internal combustion engine.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to the manufacturing industries of various equipment and apparatuses including a built-in internal combustion engine as well as automobiles equipped with an internal combustion engine.

The invention claimed is:

1. An engine misfire detection apparatus for detecting a misfire of a multi-cylinder internal combustion engine in a hybrid system where the internal combustion engine is equipped with an emission control device for emission control in an exhaust system, the engine misfire detection apparatus comprising:
a rotational position detector that detects a rotational position of an output shaft of the internal combustion engine;
a unit angle rotation time computation module that computes a unit angle rotation time, as a time required for rotation of every preset unit rotational angle of the output shaft of the internal combustion engine, from the detected rotational position; and
an engine misfire identification module that, when the internal combustion engine is under warm-up acceleration control for accelerating warm-up of the emission control device, divides multiple engine misfire patterns into at least two preset groups based on the computed unit angle rotation time and identifies a current engine misfire among the multiple engine misfire patterns,
when the internal combustion engine is not under the warm-up acceleration control, the engine misfire identification module dividing the multiple engine misfire patterns into plural groups different from the preset groups based on the computed unit angle rotation time and identifying the current engine misfire among the multiple engine misfire patterns.

2. The engine misfire detection apparatus in accordance with claim 1, wherein the multiple engine misfire patterns identified by the engine misfire identification module include a single engine misfire pattern with only one misfired cylinder among the multiple cylinders of the internal combustion engine, a consecutive engine misfire pattern with two consecutive misfired cylinders among the multiple cylinders, and an intermittent engine misfire pattern with two misfired cylinders located across one fired cylinder among the multiple cylinders.

3. The engine misfire detection apparatus in accordance with claim 2, wherein when the internal combustion engine is under the warm-up acceleration control, the engine misfire identification module divides the multiple engine misfire patterns into a group of the single engine misfire pattern and the intermittent engine misfire pattern and a group of the consecutive engine misfire pattern based on the computed unit angle rotation time and identifies the current engine misfire among the multiple engine misfire patterns, when the internal combustion engine is not under the warm-up acceleration control, the engine misfire identification module dividing the multiple engine misfire patterns into a group of the single engine misfire pattern and the consecutive engine misfire pattern and a group of the intermittent engine misfire pattern based on the computed unit angle rotation time and identifying the current engine misfire among the multiple engine misfire patterns.

4. The engine misfire detection apparatus in accordance with claim 3, wherein when the internal combustion engine is under the warm-up acceleration control, the engine misfire identification module identifies the current engine misfire as the group of the consecutive engine misfire pattern in response to the computed unit angle rotation time that exceeds a preset first time, and identifies the current engine misfire as the group of the single engine misfire pattern and the intermittent engine misfire pattern in response to the computed unit angle rotation time that does not exceed the preset first time but exceeds a preset second time shorter than the first time, when the internal combustion engine is not under the warm-up acceleration control, the engine misfire identification module identifying the current engine misfire as the group of the intermittent engine misfire pattern in response to the computed unit angle rotation time that exceeds a preset third time, and identifying the current engine misfire as the group of the single engine misfire pattern and the consecutive engine misfire pattern in response to the computed unit angle rotation time that does not exceed the preset third time but exceeds a preset fourth time shorter than the third time.

5. The engine misfire detection apparatus in accordance with claim 3, wherein when the internal combustion engine is under the warm-up acceleration control, the engine misfire identification module discriminates the group of the single engine misfire pattern and the intermittent engine misfire pattern from the group of the consecutive engine misfire pattern and identifies the current engine misfire between the single engine misfire pattern and the intermittent engine misfire pattern based on a preset angle difference of the computed unit angle rotation time.

6. The engine misfire detection apparatus in accordance with claim 5, wherein when the internal combustion engine is under the warm-up acceleration control, the engine misfire identification module discriminates the group of the single engine misfire pattern and the intermittent engine misfire pattern from the group of the consecutive engine misfire pattern and identifies the current engine misfire between the single engine misfire pattern and the intermittent engine misfire pattern based on either of a 360-degree difference and a 120-degree difference of the computed unit angle rotation time.

7. The engine misfire detection apparatus in accordance with claim 6, wherein when the internal combustion engine is under the warm-up acceleration control, the engine misfire identification module discriminates the group of the single engine misfire pattern and the intermittent engine misfire pattern from the group of the consecutive engine misfire pattern and identifies the current engine misfire as the single engine misfire pattern in response to the 360-degree difference exceeding a preset first threshold value only once in a 720-degree range and the 120-degree difference exceeding a preset second threshold value only once in the 720-degree range, while identifying the current engine misfire as the intermittent engine misfire pattern in response to the 360-degree difference exceeding the preset first threshold value twice in the 720-degree range and the 120-degree difference exceeding the preset second threshold value twice in the 720-degree range.

8. The engine misfire detection apparatus in accordance with claim 3, wherein when the internal combustion engine is not under the warm-up acceleration control, the engine misfire identification module discriminates the group of the single engine misfire pattern and the consecutive engine misfire pattern from the group of the intermittent engine misfire pattern and identifies the current engine misfire between the single engine misfire pattern and the consecutive engine misfire pattern based on a preset angle difference of the computed unit angle rotation time.

9. The engine misfire detection apparatus in accordance with claim 8, wherein when the internal combustion engine is not under the warm-up acceleration control, the engine misfire identification module discriminates the group of the single engine misfire pattern and the consecutive engine misfire pattern from the group of the intermittent engine misfire pattern and identifies the current engine misfire between the single engine misfire pattern and the consecutive engine misfire pattern based on either of a 360-degree difference and a 120-degree difference of the computed unit angle rotation time.

10. The engine misfire detection apparatus in accordance with claim 9, wherein when the internal combustion engine is not under the warm-up acceleration control, the engine misfire identification module discriminates the group of the single engine misfire pattern and the consecutive engine misfire pattern from the group of the intermittent engine misfire pattern and identifies the current engine misfire as the single engine misfire pattern based on patterns of the 360-degree difference and the 120-degree difference of the computed unit angle rotation time, while identifying the current engine misfire as the consecutive engine misfire pattern in response to failed identification as the single engine misfire pattern based on the patterns of the 360-degree difference and the 120-degree difference of the computed unit angle rotation time.

11. The engine misfire detection apparatus in accordance with claim 1, wherein the engine misfire identification module divides the multiple engine misfire patterns into the at least two groups based on the computed unit angle rotation time and identifies the current engine misfire in one of the at least two groups based on a preset angle difference of the computed unit angle rotation time.

12. The engine misfire detection apparatus in accordance with claim 11, wherein the preset angle difference is either of a 360-degree difference and a 120-degree difference.

13. An engine misfire detection method of detecting a misfire of a multi-cylinder internal combustion engine in a hybrid system where the internal combustion engine is equipped with an emission control device for emission control in an exhaust system,
- when the internal combustion engine is under warm-up acceleration control for accelerating warm-up of the emission control device, the engine misfire detection method computing a unit angle rotation time, as a time required for rotation of every preset unit rotational angle of an output shaft of the internal combustion engine, from a rotational position of the output shaft of the internal combustion engine, dividing multiple engine misfire patterns into at least two preset groups based on the computed unit angle rotation time, and identifying a current engine misfire among the multiple engine misfire patterns,
- when the internal combustion engine is not under the warm-up acceleration control, the engine misfire detection method computing the unit angle rotation time, dividing the multiple engine misfire patterns into plural groups different from the preset groups based on the computed unit angle rotation time, and identifying the current engine misfire among the multiple engine misfire patterns.

14. The engine misfire detection method in accordance with claim 13,
- wherein the multiple engine misfire patterns include a single engine misfire pattern with only one misfired cylinder among the multiple cylinders of the internal combustion engine, a consecutive engine misfire pattern with two consecutive misfired cylinders among the multiple cylinders, and an intermittent engine misfire pattern with two misfired cylinders located across one fired cylinder among the multiple cylinders, and
- when the internal combustion engine is under the warm-up acceleration control, the engine misfire detection method divides the multiple engine misfire patterns into a group of the single engine misfire pattern and the intermittent engine misfire pattern and a group of the consecutive engine misfire pattern based on the computed unit angle rotation time and identifies the current engine misfire among the multiple engine misfire patterns,
- when the internal combustion engine is not under the warm-up acceleration control, the engine misfire detection method dividing the multiple engine misfire patterns into a group of the single engine misfire pattern and the consecutive engine misfire pattern and a group of the intermittent engine misfire pattern based on the computed unit angle rotation time and identifying the current engine misfire among the multiple engine misfire patterns.

15. The engine misfire detection method in accordance with claim 14, wherein when the internal combustion engine is under the warm-up acceleration control, the engine misfire detection method identifies the current engine misfire as the group of the consecutive engine misfire pattern in response to the computed unit angle rotation time that exceeds a preset first time, and identifies the current engine misfire as the group of the single engine misfire pattern and the intermittent engine misfire pattern in response to the computed unit angle rotation time that does not exceed the preset first time but exceeds a preset second time shorter than the first time,
- when the internal combustion engine is not under the warm-up acceleration control, the engine misfire detection method identifying the current engine misfire as the group of the intermittent engine misfire pattern in response to the computed unit angle rotation time that exceeds a preset third time, and identifying the current engine misfire as the group of the single engine misfire pattern and the consecutive engine misfire pattern in response to the computed unit angle rotation time that does not exceed the preset third time but exceeds a preset fourth time shorter than the third time.

16. The engine misfire detection method in accordance with claim 14, wherein when the internal combustion engine is under the warm-up acceleration control, the engine misfire detection method discriminates the group of the single engine misfire pattern and the intermittent engine misfire pattern from the group of the consecutive engine misfire pattern and identifies the current engine misfire between the single engine misfire pattern and the intermittent engine misfire pattern based on a preset angle difference of the computed unit angle rotation time.

17. The engine misfire detection method in accordance with claim 16, wherein when the internal combustion engine is under the warm-up acceleration control, the engine misfire detection method discriminates the group of the single engine misfire pattern and the intermittent engine misfire pattern from the group of the consecutive engine misfire pattern and identifies the current engine misfire between the single engine misfire pattern and the intermittent engine misfire pattern based on either of a 360-degree difference and a 120-degree difference of the computed unit angle rotation time.

18. The engine misfire detection method in accordance with claim 17, wherein when the internal combustion engine is under the warm-up acceleration control, the engine misfire detection method discriminates the group of the single engine misfire pattern and the intermittent engine misfire pattern from the group of the consecutive engine misfire pattern and identifies the current engine misfire as the single engine misfire pattern in response to the 360-degree difference exceeding a preset first threshold value only once in a 720-degree range and the 120-degree difference exceeding a preset second threshold value only once in the 720-degree range, while identifying the current engine misfire as the intermittent engine misfire pattern in response to the 360-degree difference exceeding the preset first threshold value twice in the 720-degree range and the 120-degree difference exceeding the preset second threshold value twice in the 720-degree range.

19. The engine misfire detection method in accordance with claim 14, wherein when the internal combustion engine is not under the warm-up acceleration control, the engine misfire detection method discriminates the group of the single engine misfire pattern and the consecutive engine misfire pattern from the group of the intermittent engine misfire pattern and identifies the current engine misfire between the single engine misfire pattern and the consecutive engine misfire pattern based on a preset angle difference of the computed unit angle rotation time.

20. The engine misfire detection method in accordance with claim 19, wherein when the internal combustion engine is not under the warm-up acceleration control, the engine misfire detection method discriminates the group of the single engine misfire pattern and the consecutive engine misfire pattern from the group of the intermittent engine misfire pattern and identifies the current engine misfire between the single engine misfire pattern and the consecutive engine misfire pattern based on either of a 360-degree difference and a 120-degree difference of the computed unit angle rotation time.

21. The engine misfire detection method in accordance with claim 20, wherein when the internal combustion engine is not under the warm-up acceleration control, the engine misfire detection method discriminates the group of the single engine misfire pattern and the consecutive engine misfire pattern from the group of the intermittent engine misfire pattern and identifies the current engine misfire as the single engine misfire pattern based on patterns of the 360-degree difference and the 120-degree difference of the computed unit angle rotation time, while identifying the current engine misfire as the consecutive engine misfire pattern in response to failed identification as the single engine misfire pattern based on the patterns of the 360-degree difference and the 120-degree difference of the computed unit angle rotation time.

22. The engine misfire detection method in accordance with claim 13, wherein the engine misfire detection method divides the multiple engine misfire patterns into the at least two groups based on the computed unit angle rotation time and identifies the current engine misfire in one of the at least two groups based on a preset angle difference of the computed unit angle rotation time.

* * * * *